US005265411A

United States Patent [19]

Belsom

[11] Patent Number: 5,265,411

[45] Date of Patent: Nov. 30, 1993

[54] ATTACHMENT CLIP

[75] Inventor: Keith C. Belsom, Stuart, Fla.

[73] Assignee: United Technologies Corporation, Hartford, Conn.

[21] Appl. No.: 956,211

[22] Filed: Oct. 5, 1992

[51] Int. Cl.[5] ................................ F02C 7/20

[52] U.S. Cl. ................................ 60/39.31; 60/39.32; 60/752; 292/283; 292/340; 411/523; 411/529

[58] Field of Search ................ 60/39.31, 39.32, 752; 411/522, 523, 529; 292/283, 295, 340

[56] References Cited

U.S. PATENT DOCUMENTS 3,459,096 8/1967 Parkin ................ 411/523
4,512,159 4/1985 Memmen ................ 60/39.32
4,623,050 11/1986 Copp ................ 411/522
4,848,089 7/1989 Cramer ................ 411/523

FOREIGN PATENT DOCUMENTS 2515301 11/1975 Fed. Rep. of Germany ...... 411/523

*Primary Examiner*—Richard A. Bertsch
*Assistant Examiner*—W. J. Wicker
*Attorney, Agent, or Firm*—Christopher T. Hayes

[57] ABSTRACT

This invention relates to a clip for securing a segmented panel, such as that of a combustor liner for a gas turbine engine, to the outer shell of the combustor, a clip characterized by having two distinctly different spring rates depending on the magnitude of the load which the clip must support.

12 Claims, 3 Drawing Sheets

ATTACHMENT CLIP

The invention was made under a U.S. Government contract and the Government has rights herein.

TECHNICAL FIELD

This invention relates to clip attachments and particularly to a clip retention mechanism for securing FLOATWALL ® panel segments to the outer shell of the combustor liner for a gas turbine type power plant.

BACKGROUND ART

This invention constitutes an improvement over U.S. Pat. No. 4,302,941 granted to T. L. DuBell on Dec. 1, 1981, entitled "Combustion Liner Construction for Gas Turbine Engine" and U.S. Pat. No. 4,512,159 granted to R. L. Memmen on Apr. 23, 1985, entitled "Clip Attachment", both of which are assigned to United Technologies Corporation, the same assignee as this patent application. FLOATWALL ® combustor wall includes an outer shell which may be formed in a complete hoop or segmented and has attached thereto a plurality of free floating panel segments positioned radially inward from the shell and adapted to shift in response to the thermals and vibratory forces of the system. Such designs are capable of withstanding the hostile environment which they are subjected with high durability characteristics.

The problem inherent in the FLOATWALL ® combustor design is the attachment of the floating wall panel segments to the outer shell. One such scheme used heretofore is forming a hook integral with the segmented FLOATWALL ® panel that passes through an aperture in the outer shell to which is attached a strap. Such a system is relatively complex and expensive.

The prior art U.S. Pat. No. 4,512,159 contemplates attaching the FLOATWALL ® panel segments by a spring clip adapted to fit onto an integral post so as to preload the panel segment toward the shell. Since the clips are removable without damage to the post, the removal of panel segments is facilitated which enhances the maintainability of the combustor. This type of clip has a spring portion that supports the panel segment, and experience has shown that such spring clips tend to lose their ability to preload after a relatively short operating time and must therefore be replaced. The clips lose their ability to preload because the stress in the spring portion caused by the preload is relatively high as compared to the deflection in the spring portion caused by that preload. Put another way, the "spring rate" (the ratio of stress to deflection) of the spring clip is too great, causing the spring portion of the clip to permanently deform instead of simply flexing. Although some permanant deformation of the spring portion can occur without impairing the preloading function of the clip, once excessive deformation of the spring portion occurs, the clip loses its ability to preload the panel segment and must be replaced.

What is needed is an attachment clip that provides the benefits of the prior art clips and is less subject to losing its preload capability during use.

DISCLOSURE OF THE INVENTION

An object of the present invention is to provide for the combustor of a turbine type power plant and improved retention means for FLOATWALL ® panel segments capable of imparting two different spring rates to the post of a panel segment.

Another object of the present invention is to provide a novel clip design adapted to secure a removable assembly with the clip which is clipped onto a cooperating post in which the clip is capable of imparting two different spring rates to the post.

Another object of the present invention is to provide an improved spring clip retention which is characterized as being relatively inexpensive and retains the installed parts in a positive manner.

Accordingly, the spring clip of the present invention fits an integral post such as that formed on the FLOATWALL ® panel segment and spring loads the panel segment to the outer shell axially of the post while allowing relative movement of the panel segment and shell radially of the post. The clip includes a leaf spring cantilevered from a U-shaped spring portion having a much lower spring rate than the leaf spring. The leaf spring directly supports the post, and is in turn supported by the U-shaped spring when the magnitude of the load acting on the spring clip is below a predetermined design value, thereby imparting a first spring rate to the post. When value of the load equals or exceeds the predetermined value, the previously cantilevered leaf spring contacts the shell and provides a second spring rate to the post which is greater than the first spring rate. A self-retaining tab on the clip protects against inadvertent dislodging, and the design of the slots in the post prevents rotation of the clip and facilitates the insertion of the clip thereon.

BEST MODE FOR CARRYING OUT THE INVENTION

While this invention in its preferred embodiment constitutes an improvement on the FLOATWALL ® panel segments as described in U.S. Pat. Nos. 4,302,941 and 4,512,159, supra, and utilized for aircraft engines manufactured by the Pratt & Whitney Division of United Technologies Corporation, it is to be understood that this retention system may be employed in other types of combustor liner configurations or components of the engine. For example, such as improvement may be utilized in the transition duct leading the combustion products from the burners to the turbine inlet.

Figure 1:
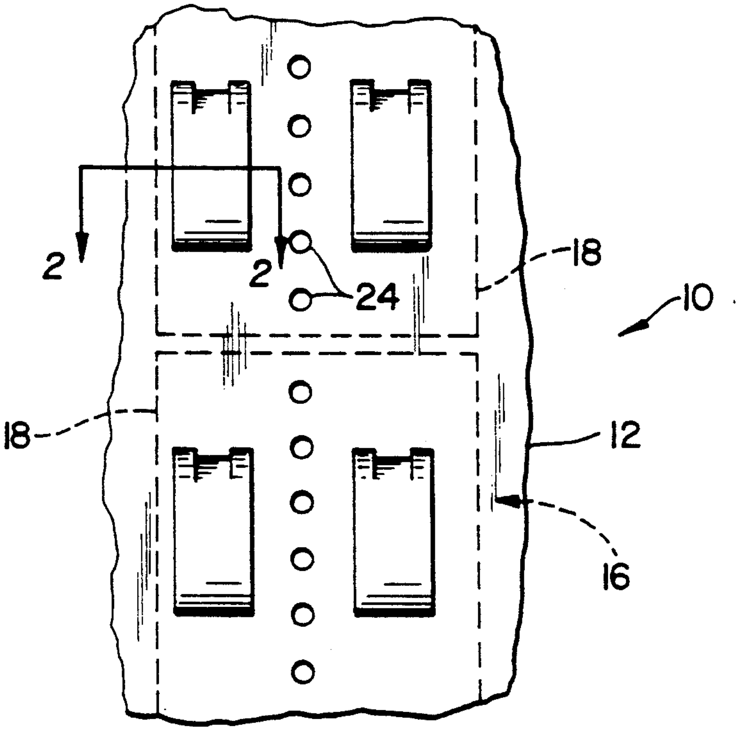
FIG. 1 is a partial plan view of the shell and FLOATWALL ® panel segment with the improved retention means.
Figure 2:
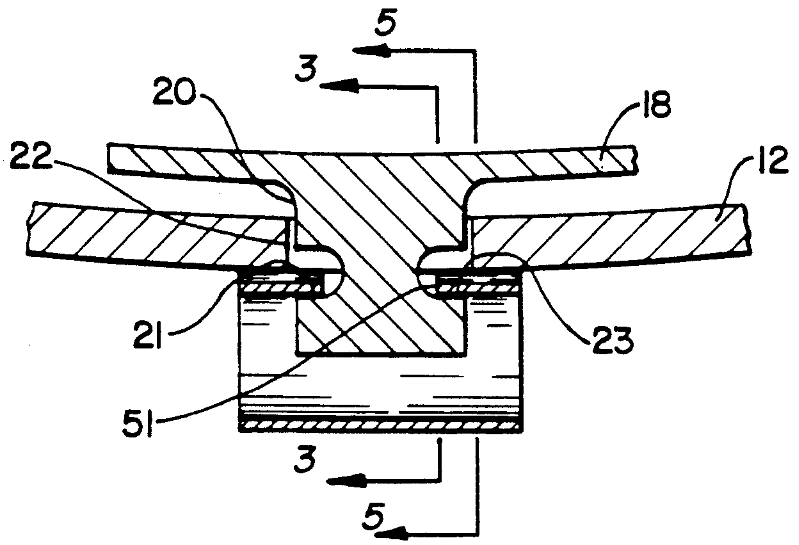
FIG. 2 is a sectional view taken along section line 2—2 of FIG. 1 showing the post protruding through an aperture formed in the shell.
Figure 3:
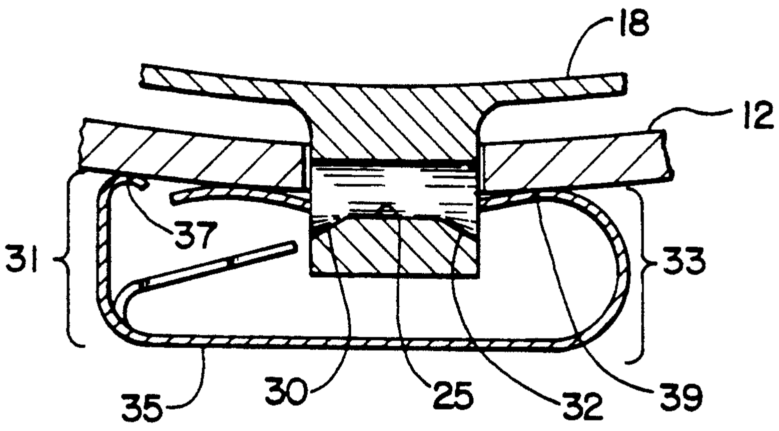
FIG. 3 is a sectional view taken along line 3—3 of FIG. 2.

Referring to FIGS. 1-4 the combustor 10 (only partially shown) comprises outer shell 12 and an inner liner 16. The inner liner 16, defining the flow path of the engine's working medium, comprises a plurality of segmented members, or panel segments 18, spaced around the circumference of the shell 12 and extending axially of the engine along the flow path. As shown in FIG. 2, each panel segment 18 carries at least one integral post 20 having a diameter small enough to extend radially through apertures 22 formed in shell 12. As noted, the posts 20 are slotted at diametrically opposed sides 21, 23, in a direction specifically related to the cooling air holes 24 of FIG. 1. In this instance the post slots are located adjacent, but spaced from, the terminal end of the post, and are generally parallel to the row of cooling air holes 24. The important consideration is that the post slots are designed so that when the clip 36 of the present invention is secured to the post 20 it does not rotate and obstruct these cooling air holes 24. Each side of the lower shoulder 25 adjacent the post slots 21 and 23 is beveled at 30 and 32 as shown in FIG. 3. This ramp serves to facilitate the assembly of the clip.

As shown in FIGS. 3–6, the clip 36 comprises first and second generally U-shaped portions 31, 33, and each U-shaped portion 31, 33 is integral with a substantially straight leg 35 extending therebetween. As shown in FIG. 3, the U-shaped portions 31, 33 need not be identical in shape, however, each includes at least one foot 37, 39 that bears upon the surface of the shell 12 opposite the panel segment 18. The clip 36 may be stamped out of a relatively thin flat stock of highly resilient and flexible material capable of withstanding the hostile operating environment, and must be sufficiently flexible and resilient to impart a spring load to the panel segments 28 and shell 12 as is described hereinbelow.

Figure 4:
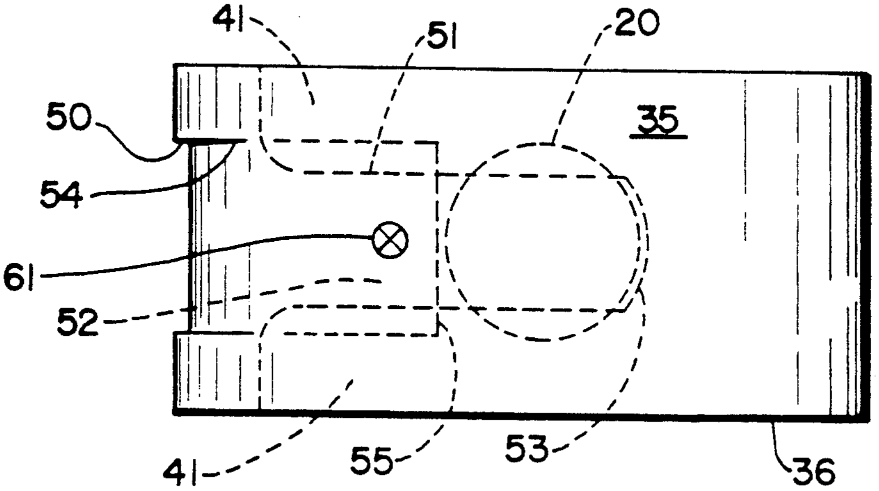
FIG. 4 is a plan view of the clip.
Figure 5:
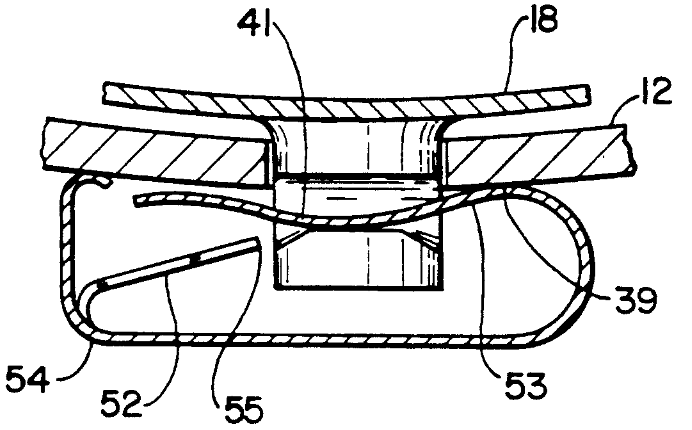
FIG. 5 is a sectional view taken along line 5—5 of FIG. 2 showing the clip in the installed position with the force magnitude less than the predetermined value.
Figure 6:
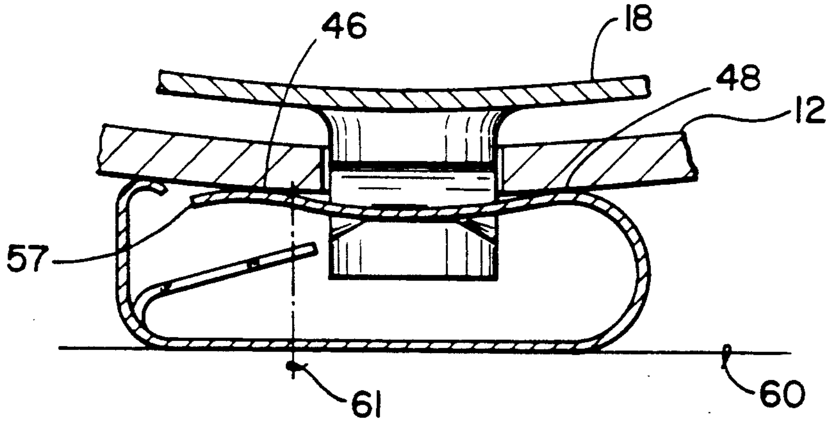
FIG. 6 is the sectional view of FIG. 5 showing the clip in the installed position with the force magnitude equal to or greater than the predetermined value.

As shown in FIGS. 4–6, the clip 36 includes a leaf spring 41 extending from the foot 39 of one of the U-shaped portions 33 and is integral therewith. The leaf spring 41 is sinusoidally shaped so that the high points 46 and 48 contact the face of shell 12 straddling the aperture 22, bearing against the outer surface of the shell 12 at one or more predetermined points under the loading conditions described below. In its unloaded state, the leaf spring 41 is supported in cantilever fashion by one of the U-shaped portions 33, as shown in FIG. 5 and described below.

A locking slot 51 extends most of the length of the leaf spring 41, terminating in a stop just short 53 of the foot 39 of the U-shaped portion 33 with which the leaf spring 41 is integral. The locking slot 51 has a width less than the diameter of the post 20, but slightly larger than the reduced size of post 20 between the diametric slots 21 and 23 so that the post 20 can be received within the locking slot 51 at the post slots 21, 23. As those skilled in the art will readily appreciate, the locking slot 51 secures the clip 36 to the post 20 and prevents rotation of the clip 36 because the locking slot 51 is too narrow to allow the post 20 to rotate relative to the locking slot 51.

As shown in FIGS. 4–6, the U-shaped portion 31 which is not integral with the leaf spring 41 includes a locking tab 52 which is stamped out of the U-shaped portion 31. The void produced in the U-shaped portion 31 by the stamping out of the locking tab 52 forms an attachment slot 50. The attachment slot 50 has a width that is slightly greater than the diameter of the post 20 to allow the post 20 to pass therethrough unimpeded. The locking tab 52 extends from one end 54 of the attachment slot 51 toward the leaf spring 41, terminating in a tab end 55. A section of the tab 52 and the tab end 55 overlie the locking slot 51 in a manner such that the integral leg 35 of the clip 36 defines a reference plane 60, and a reference axis 61 extending perpendicular from the reference plane 60 intersects said locking slot 51 and the tab 52 adjacent the tab end 55, as shown in FIGS. 4 and 6. The locking tab 52 secures the clip 36 to the post 20 and prevents the clip 36 from sliding off the post 20 during operation of the engine.

To attach the clip 36 of the present invention to the post 20 of one of the panel segments 18, the clip 36 is positioned with the post 20 located adjacent the attachment slot 50 and the post slots 21, 23 aligned with the locking slot 51. While firmly holding the feet 37, 39 of the clip 36 against the shell 12, the clip 36 is slid towards the post 20 as the post 20 contacts the locking tab 52 and flexes the tab 52 out of the way. Continued sliding of the clip 36 in the same direction causes the post 20 to slide into the locking slot 51 of the leaf spring 41, and the leaf spring 41 to slide into the post slots 21, 23 of the post 20. The clip 36 is slid somewhat further until the post 20 clears the tab end 55, allowing the tab 52 to flex back to its original position, thereby preventing the post 20 from sliding back out through the attachment slot 50. As is apparent from the foregoing, the clip 36 is unable to slip off and hence cannot become dislodged, thereby avoiding the possibility of a loosed clip 36 being ingested in the engine's turbine. The retaining force of the tab 52 of clip 36 can be adjusted simply by making the tab 52 wider or narrower as desired.

During engine operation, the combustion and flow of the working fluid through the engine produces varying vibratory loading of the panel segment posts 20. If the magnitude of the force is less than a predetermined level for which the clip 36 of the present invention is designed, the leaf spring 41 remains cantilevered from the U-shaped portion 33 integral therewith, as shown in FIG. 5, and the spring rate acting on the post 20 is relatively low because the stress caused by the force acting on the clip 36 causes a relatively large deflection, as those skilled in the art will readily appreciate. If, however, the magnitude of the force is equal to or greater than the predetermined level, the high point 46 adjacent the terminal end 57 of the leaf spring 41 contacts the outer shell 12, as shown in FIG. 6, and the leaf spring 41 of the clip 36 is supported in "beam" fashion as opposed to cantilever fashion. As those skilled in the art will readily appreciate, when the leaf spring 41 is supporting the post in "beam" fashion, the stress caused by the force acting on the clip 36 causes a relatively small deflection as compared to the cantilever support discussed above, resulting in a higher spring rate. Under this latter condition, the leaf spring rate acts in series with the aforementioned cantilevered spring rate, but because the leaf spring 41 is designed to have a significantly higher spring rate than the U-shaped portion 33, the actual spring rate acting on the post 20 is essentially that of the leaf spring 41. This preloads the shell 12 and panel segment 18 toward each other in a direction axial of the post 20, and because the post 20 is free to shift within the aperture 22, the shell 12 and panel segment 18 are free to shift relative to each other as well, thereby minimizing chattering and cycle fatigue problems while preventing any acoustical problems that might otherwise occur.

Thus the clip 36 of the present invention biases the panel segment 18 toward the shell 12 at varying spring rates depending on the particular conditions acting on the shell 12 and panel segment 18. The lower force magnitude loads are borne predominantly by the U-shaped portions 31, 33 and the integral leg 35, providing a low spring rate that has little detrimental impact on the ability of the clip 36 to preload the panel segment 18, while the higher force magnitude loads are borne predominantly by the leaf spring 41 at the higher spring rate. The clip design of the present invention reduces the amount of operating time that the leaf spring 41 is predominantly loaded, thereby extending the useable life of the clip 36 of the present invention over that of the prior art.

Although the clip 36 is disclosed as being for use in a gas turbine engine, those skilled in the art will readily appreciate that the clip 36 and post 20 would be useful for many applications in which it is desirable to have a certain amount of "give" followed by a substantially greater amount of "give". Examples of such applications would be trim panels in vehicles such as cars, trucks, planes, etc., which are subject to vibration when rigidly attached to the vehicle body. The clip 36 allows such panels to move in response to the vibration, while the leaf spring 41 portion of the clip 36 ensures that the panel will not become detached, Accordingly, although this invention has been shown and described with respect to detailed embodiments thereof, it will be understood by those skilled in the art that various changes in form and detail thereof may be made without departing from the spirit and scope of the claimed invention.

I claim:

1. A clip for securing a first component to a post of a second component, said clip comprising means for securing the clip to said post; and means for biasing said second component in a first direction toward said first component, said biasing means including primary spring means having a first spring rate and comprising first and second generally U-shaped portions, each portion integral with a leg extending therebetween, and each U-shaped portion having at least one foot that bears directly upon the first component, secondary spring means having a second spring rate, said second spring rate greater than said first spring rate;

wherein said primary spring means bears on said first component and supports said secondary spring means in contact with said post thereby biasing the second component toward the first component at the first spring rate when a force magnitude acting axially of the post in a direction opposite the first direction is below a predetermined value, and said secondary spring means acts in series with said primary spring means to bias the second component toward the first component at a spring rate greater than said first spring rate when the force magnitude is equal to or greater than the predetermined value.

2. The clip of claim 1 wherein the secondary spring means comprise a leaf spring, said leaf spring integral with one of said U-shaped portions.

3. The clip of claim 2 wherein said post has a first diameter and includes first slot means spaced from the end of said post, and said means for securing the clip to said post comprise a second slot in said leaf spring having a width less than said first diameter, said second slot engageable with said first slot means for receiving said post within said second slot.

4. The clip of claim 3 wherein said leaf spring is sinusoidally shaped and bears against the surface of said first component at one or more predetermined points when the force magnitude is equal to or greater than the predetermined value.

5. The clip of claim 4 wherein one of said U-shaped portions includes a third slot having a width greater than the first diameter, and a locking tab extending from one end of said third slot toward said leaf spring and terminating in a tab end, a section of said tab and said tab end overlying said second slot.

6. The clip of claim 5 wherein said leg defines a reference plane, and a reference axis extending perpendicular from said reference plane intersects said second slot and said tab adjacent said tab end.

7. In combination, a combustor for a gas turbine engine having an outer shell and a plurality of inner segmented free floating members conforming to the shape of the outer shell defining a combustion section, each segmented member movable in response to the combustion products relative to the outer shell, means for securing said segmented members to said outer shell including at least one post integral with each of said segmented members extending through an aperture in said shell, a clip comprising means for securing the clip to said post, and means for biasing each of said segmented members in a first direction toward said outer shell, said biasing means including primary spring means having a first spring rate and comprising first and second generally U-shaped portions, each portion integral with a leg extending therebetween, and each U-shaped portion having at least one foot that bears directly on said outer shell, secondary spring means having a second spring rate, said second spring rate greater than said first spring rate, wherein said primary spring means bears on said outer shell and supports said secondary spring means in contact with said post of said segmented member biasing the segmented member toward the outer shell at the first spring rate when a force magnitude acting axially of the post in a direction opposite the first direction is below a predetermined value, and said secondary spring means acts in series with said primary spring means to bias the segmented member toward the outer shell at a spring rate greater than said first spring rate when the force magnitude is equal to or greater than the predetermined value.

8. The clip of claim 7 wherein the secondary spring means comprise a leaf spring, said leaf spring integral with one of said U-shaped portions.

9. The clip of claim 8 wherein said post has a first diameter and includes first slot means spaced from the end of said post, and said means for securing the clip to said post comprise a second slot in said leaf spring having a width less than said first diameter, said second slot engageable with said first slot means for receiving said post within said second slot.

10. The clip of claim 9 wherein said leaf spring is sinusoidally shaped and bears against the surface of said shell at one or more predetermined points when the force magnitude is equal to or greater than the predetermined value to bias the segmented member towards the shell.

11. The clip of claim 10 wherein one of said U-shaped portions includes a third slot having a width greater than the diameter of said post, and a locking tab extending from one end of said third slot toward said leaf spring and terminating in a tab end, wherein a section of said tab and said tab end is overlying said second slot.

12. The clip of claim 11 wherein said leg defines a reference plane, and a reference axis extending perpendicular from said reference plane intersects said second slot and said tab adjacent said tab end.

* * * * *